(12) United States Patent
Sacknoff

(10) Patent No.: US 8,264,365 B2
(45) Date of Patent: Sep. 11, 2012

(54) MOTION SENSING REMOTE MICROPHONE

(76) Inventor: Eric Sacknoff, New York, NY (US)

( * ) Notice: Subject to any disclaimer, the term of this patent is extended or adjusted under 35 U.S.C. 154(b) by 430 days.

(21) Appl. No.: 12/543,551

(22) Filed: Sep. 21, 2009

(65) Prior Publication Data
US 2011/0068944 A1    Mar. 24, 2011

(51) Int. Cl.
*G08B 21/00* (2006.01)
(52) U.S. Cl. ............... 340/669; 340/539.26; 340/521
(58) Field of Classification Search ............ 340/669, 340/539.26, 521, 517, 628, 603, 568.1, 571, 340/539.22, 577, 384.73, 573.1, 573.7, 539.11, 340/539.13
See application file for complete search history.

(56) References Cited

U.S. PATENT DOCUMENTS

| | | | |
|---|---|---|---|
| 4,914,422 A | 4/1990 | Rosenfield et al. | |
| 5,045,839 A | 9/1991 | Ellis et al. | |
| 5,309,922 A | 5/1994 | Schechter et al. | |
| 5,865,759 A | 2/1999 | Koblanski | |
| 6,028,514 A * | 2/2000 | Lemelson et al. | 340/539.13 |
| 6,765,486 B2 | 7/2004 | Roberts | |
| 7,382,249 B2 | 6/2008 | Fancella | |
| 7,437,931 B2 | 10/2008 | Dwyer et al. | |
| 7,710,277 B2 * | 5/2010 | Wilson | 340/573.1 |
| 2003/0067385 A1 | 4/2003 | Shank et al. | |
| 2003/0156688 A1 * | 8/2003 | McCarty et al. | 379/67.1 |
| 2003/0231110 A1 * | 12/2003 | Roberts | 340/539.11 |
| 2004/0066302 A1 | 4/2004 | Menard et al. | |
| 2009/0069720 A1 | 3/2009 | Beck et al. | |
| 2009/0322540 A1 * | 12/2009 | Richardson et al. | 340/573.7 |

FOREIGN PATENT DOCUMENTS
WO  PCT/US2004/016800    12/2004
* cited by examiner

*Primary Examiner* — Daniel Previl

(57) ABSTRACT

An apparatus and method comprising of a remote microphone, attached to a portable radio, incorporating a motion sensing component, such as a Solid State Accelerometer, and an orientation sensing component, such as a Solid State Gyroscope or a multidirectional Solid State Accelerometer and activated by the wearer's motionlessness and subsequently activates the Emergency Alert and sends out an audible distress signal, a radio frequency (RF) distress signal, or both, as if the wearer had pressed the Emergency Alert button.

16 Claims, 3 Drawing Sheets

MOTION SENSING REMOTE MICROPHONE

FIELD OF THE INVENTION

The present invention relates generally to the field of motion sensing devices and more particularly relates to a motion sensing remote microphone for automatically detecting a state of motionlessness and providing Emergency Alert to others when the wearer of the device has become immobilized or incapacitated.

BACKGROUND OF THE INVENTION

Prompt recovery of an incapacitated or trapped person, such as a Firefighter, or other First Responder requires rapid notification that the person has been trapped or incapacitated, as well as rapid location of the person. Hence it has long been recognized for the need for some sort of a signaling device to be activated when a Firefighter or other First responder becomes trapped or unconscious.

There are a variety of motion detectors known in the art to detect movement of the person, and which would be suitable for use as part of the rescue device. Many of these motion detectors monitor the acceleration of an element thereof and, from this, deduce the state of movement of the device using the electronic sensing devices such as accelerometers and gyroscopes. The accelerometer senses the linear acceleration in multiple directions, from which calculations such as velocity, direction and position can be derived. The Gyroscope senses an angular velocity of the wearer and outputs angular velocity data based on the sensed angular velocity. A multi-directional Accelerometer senses linear acceleration in multiple directions and gravitational orientation.

Many Firefighter and other First Responder radios come equipped with an Emergency Alert Button. This button may be found on the radio body only or both the radio body and remote microphone (the remote microphone is attached to the main radio body by a short cord and is usually worn on the chest, shoulder or collar area for easier transmissions). Activation of the Emergency Alert is achieved by depressing one of the provided buttons. The activation may send out an audible distress signal, a Radio Frequency (RF) distress signal, or both. The RF distress signal may be transmitted at a higher wattage and contain specific information about the identity of the sender.

A shortcoming in the Radio Frequency distress systems is found when a Firefighter or other First Responder suddenly becomes incapacitated or unconscious. In such a situation the radio's Emergency Alert button will not be activated.

National Fire Protection Association standards require a passive device to be installed in all compliant air packs. These motion sensors, when activated, send out a generic audible alarm. The alarm is akin to a siren that provides a general alert only to those within audible range. The alarm may alert would-be rescuers but fails to identify the sender or be logged or tracked.

There is a need for some sort of an RF (radio frequency) signaling device to be activated when a Firefighter or other First Responder becomes trapped or unconscious.

The relevant prior art methods, which will deal with motion sensors, are as follows:

U.S. Pat. No. 7,382,249 provides a combined alarm and surveillance system and integrates an existing alarm system with an existing surveillance system such that functions unique to each system are combined in a complementary manner. The existing alarm and surveillance systems are combined via an interface comprising an array of electric relays. Each relay receives a signal from either the alarm system or the surveillance system and retransmits the signal to the other system in a form that is compatible with the receiving system. The alarm system is configured to communicate alarm status information to the surveillance system, and the surveillance system is configured to communicate control signals to the alarm system, such as an alarm system reset signal.

U.S. Pat. No. 7,437,931 details a sensor unit to detect a stillness event, the sensor unit including a gyroscope attached to a monitored person, a micro-controller communicatively coupled to the gyroscope, and a memory communicatively coupled to receive and to store the angular velocity data with a correlated time. The gyroscope senses an angular velocity of the monitored person and outputs angular velocity data based on the sensed angular velocity. The micro-controller receives the angular velocity data and recognizes a quiescence-pattern data in the angular velocity data.

U.S. Pat. No. 4,914,422 claims a personal alert safety system (PASS) of the type carried by firefighters, rescuers, and the like. The unit attaches to the firefighters shoulder harness and is characterized by its ability to indicate audibly temperature changes in 100.degree F. increments within the hazardous environment, as well as lack of motion by the firefighter. The activating circuit includes a horn alarm signaling both temperature changes and lack of motion, such that both the firefighter, as well as his colleagues, may be audibly appraised.

US Patent Application 20030067385 describes a motion sensor system that has several sensor units. Each sensor unit is freely movable, easily hidden and includes a motion sensor and a wireless radio frequency (RF) transmitter. The motion sensor system further includes a receiver unit, which includes a wireless radio frequency receiver and a device for communicating receipt of a signal to the user. When at least one of the motion sensors of at least one of the sensor units detects motion, the wireless radio frequency transmitter transmits a signal to the radio frequency receiver of the receiver unit. The receiver unit then communicates receipt of the signal to the user.

US Patent Application 20090069720 comprises an implantable activity detector can detect metabolic stress levels, which can be normalized, such as to identify times of activities such as walking and running or to identify trends such as a decrease in metabolic activity. The data can be derived from different sources such as an accelerometer and pedometer. This data can be compared to independently specifiable thresholds, such as to trigger an alert or responsive therapy, or to display one or more trends. The information can also be combined with other congestive heart failure (CHF) indications. The alert can notify the patient or a caregiver, such as via remote monitoring. Metabolic activity data from one or more of the activity detectors can be used to establish a model of metabolic stress, to which further activity data can be compared for identifying periods of increased or decreased metabolic stress.

US Patent Application 20040066302 provides a Portable accelerometer coupled to a processor and wireless transceiver providing remote monitoring of sensed acceleration. A BLUETOOTH®-compatible transceiver allows bi-directional communication including transmission of operating parameters and programming as well arm and cancel commands. Networked communications allows remote monitoring and integration with public safety answering point (PSAP). Signal processing at the portable device discerns includes comparison of sensed acceleration with stored profile.

Shortcomings are found in the existing devices claimed in the prior art, when a Firefighter or other First Responder suddenly becomes incapacitated or unconscious. None of the above patents claims a motion sensor that can detect a state of non motion and trigger an alarm in the user's portable radio. Thus, in such a situation of motionlessness, a radio's Emergency Alert button will not be activated.

Hence, there is a need for a device and process to sense and capture the user's motionlessness and provide notice of his incapacitation to others as well as aid in quickly and precisely locating the incapacitated person while he is being concealed by smoke or other natural elements or caught in fire or other agents which block direct viewing of the user of the device.

The present invention overcomes these and other problems by providing a Motion Sensing Remote Microphone which detects the stillness and orientation of the remote microphone and automatically activates the Emergency Alert as if the wearer pressed the Emergency Alert button themselves. This invention does not require any separate or bulky gear and is incorporated into the remote microphone of the portable radio of the user.

The present invention thus closes a fatal gap in providing the fastest and most far-reaching automatic signaling system for an unconscious or incapacitated Firefighter or other First Responder. The invention is incorporated into the remote microphone in a portable radio carried by such Firefighter or other First Responder. The present invention is thus designed for use in the remote microphone on portable radios, self-powered by portable battery, and intended for personal use by a single individual. When no motion is detected for a preset time interval, an alarm signal is generated. If the motionlessness of the user is not due to a state of incapacitation or unconsciousness, the alarm can be switched off manually by the user. The activation may send out an audible distress signal, an RF distress signal, or both. The RF distress signal may be transmitted at a higher wattage and contain specific information about the identity of the sender.

Further it will be apparent to those skilled in the art that the objects of this invention have been achieved by providing a Solid State Accelerometer interfaced with a Solid State Gyroscope or a multidirectional Solid State Accelerometer in a remote microphone, geared towards portable radios carried by Firefighters and other First Responders, which is unique in nature unlike existing systems which can be able to apply only for limited purposes. Various changes may be made in and without departing from the concept of the invention. Further, features of some stages disclosed in this application may be employed with features of other stages. Therefore, the scope of the invention is to be determined by the terminology of the following claims and the legal equivalents thereof.

SUMMARY OF THE INVENTION

This present invention may be summarized, at least in part, with reference to its objects.

The foremost object of the present invention is to provide a motion sensing remote microphone attached to a portable radio, to detect the motionlessness of the user.

Another object of the present invention is to provide a motion sensing remote microphone which can be easily attached to a portable radio normally carried by the Firefighters and other First Responders.

Another object of the present invention is to provide a motion sensing remote microphone that can be automatically activated when the users become unconscious or incapacitated and provide notice to others through the Emergency Alert.

Another object of the present invention is to provide a motion sensing remote microphone that can activate a highly audible alarm to enable rescue operation, whereby the immobilized or incapacitated user can be located easily by the rescuers.

Another object of the present invention is to provide a motion sensing remote microphone that can activate an RF (radio frequency) identifying alarm to enable rescue operation, whereby the immobilized or incapacitated user can be located easily by the rescuers.

Another object of the present invention is to provide a motion sensing remote microphone that possesses various sensitivities for physically canceling an alarm sequence.

Another object of the present invention is to provide a novel motion sensing and Emergency Alert remote microphone that provides an audible pre-alarm warning signal.

Another object of the present invention is provide a novel motion sensing and Emergency Alert remote microphone that consists of various time frames for activation of both pre-alarm and full alarm modes.

Another object of the present invention is provide a novel motion sensing and Emergency Alert remote microphone that contains physical orientation/activation interface settings.

FIG. 1 is a perspective view of the Motion Sensing Remote Microphone comprising of the various components of the remote microphone including the push-to-talk button (1), a microphone (2), a speaker (3), an Emergency alert button (4), a cord to connect to the radio (5), and the body of the remote microphone consisting of a Solid State Accelerometer and a Solid State Gyroscope or a multidirectional Solid State Accelerometer (6).

Figure 1:
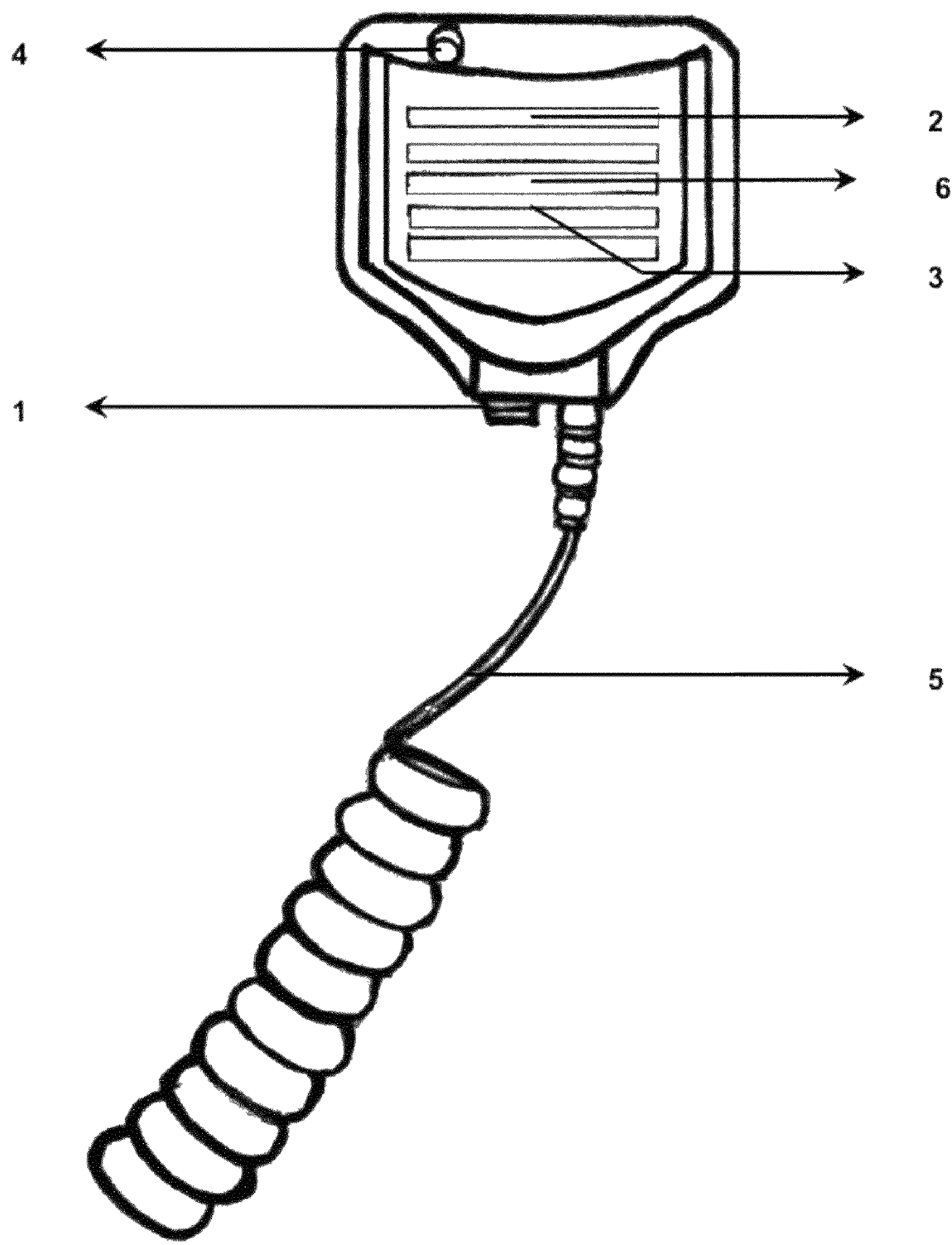
Figure 2:
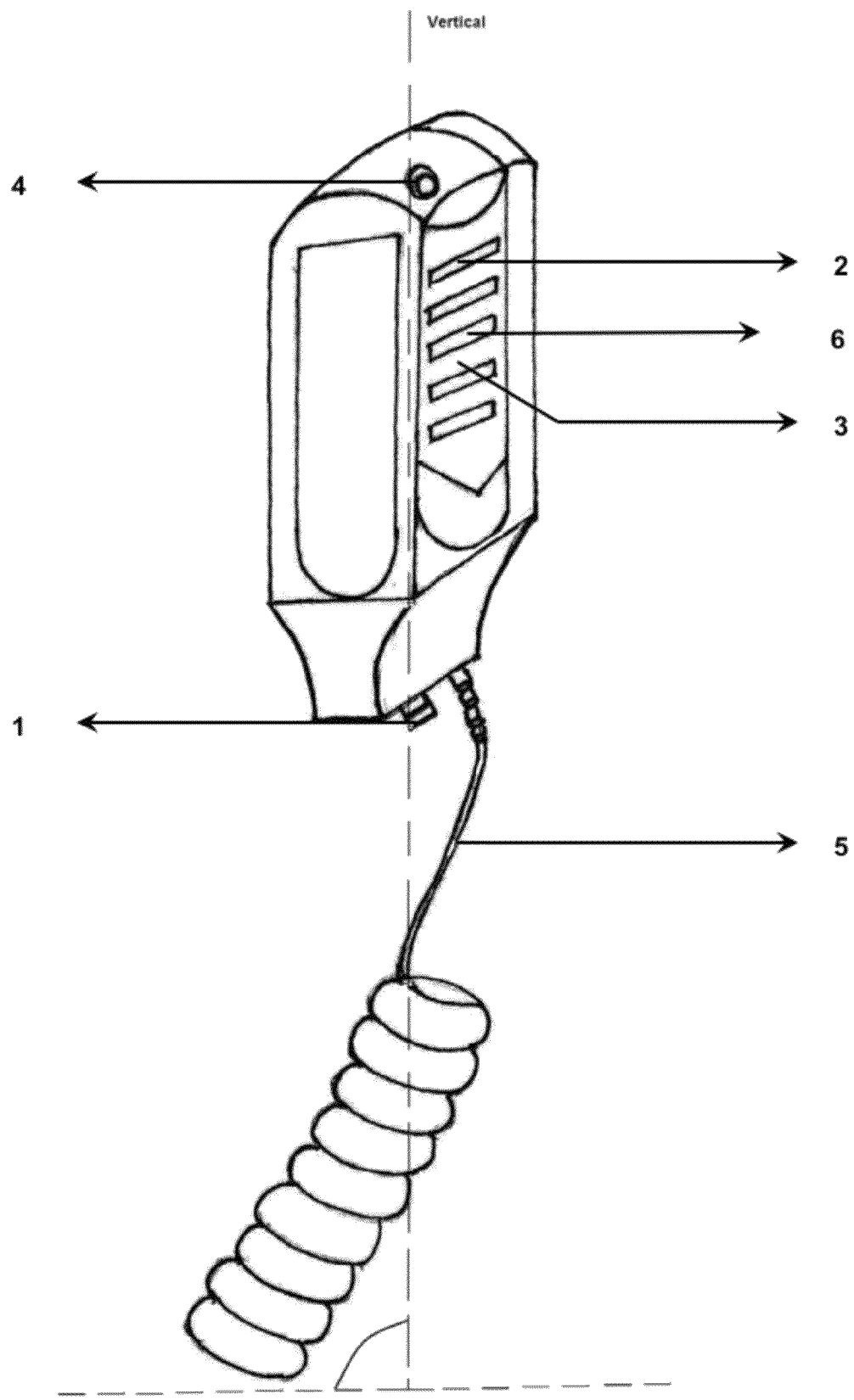
FIG. 2 is a perspective view of the Motion Sensing Remote Microphone with the longitudinal axis in the vertical plane.
Figure 3:
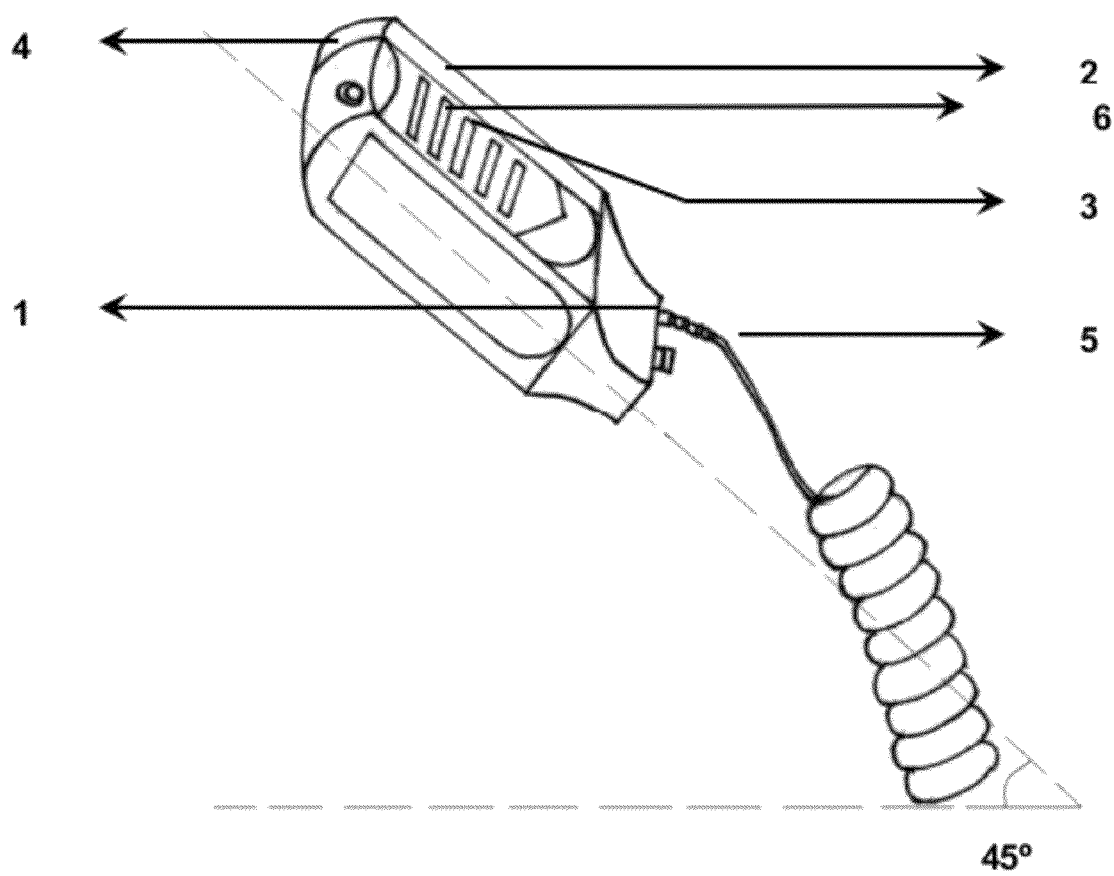
FIG. 3 is a perspective view of the Motion Sensing Remote Microphone placed at a 45 degree angle away from the vertical with designation relating to its longitudinal axis.

In accordance with the foregoing, a device and process of motion sensing remote microphone is enclosed. In an embodiment of this invention the motion sensing remote microphone includes a Solid State Accelerometer interfaced physically or electronically with a Solid State Gyroscope (6), or a multidirectional Solid State Accelerometer (6) and is geared toward portable radios. Further, the microphone provides the motion sensing and Emergency Alert capabilities automatically when the user becomes unconscious.

Additional objects and embodiments of the invention will be set forth in part in the description which follows, and in part will become apparent to those skilled in the art upon examination of the following, or may be learned by practice of the invention. These and other objects and advantages and features of the present invention will be more readily apparent when considered in reference to the following description and when taken in conjunction with the accompanying drawings listed below.

DETAILED DESCRIPTION OF THE INVENTION

The following description is presented to enable any person skilled in the art to make and use the invention, and is provided in the context of particular applications of the invention and their requirements. The present invention can be configured as follows:

The present invention provides a remote microphone specifically geared toward portable radios and equipped with automatic motion sensing capabilities and Emergency Alert capabilities, such as those carried by Firefighters and other First Responders. The portable radio shall function utilizing assigned radio frequencies and may be generated in an analog or digital mode. The said remote microphone shall have 'Emergency Alert' or distress capabilities that shall previously only have been activated via physical means, i.e. utilization of a dedicated switch, button etc (4).

In an embodiment of this invention, the above said motion sensing device incorporates a Solid State Accelerometer and a Solid State Gyroscope (6) or a multidirectional Solid State Accelerometer (6) into the radio's remote microphone. Thus, Motion and orientation sensing capabilities shall be incorporated into the body of the remote microphone (6) and be powered by same supply. Motion sensing capabilities shall be achieved through use of a Solid State Accelerometer (or similar). Orientation sensing capabilities shall be achieved through use of a Solid State Gyroscope or a multidirectional Solid State Accelerometer (6). The accelerometer is installed so as to interface with the transmission feature of the remote microphone's Emergency Alert button (4). The Motion sensor shall have programmable features for both time delay and orientation. i.e. the sensor shall activate after 100 seconds of non-movement when device is oriented in the vertical plane and activate after 30 seconds of non-movement when in the horizontal plane.

The accelerometer (6) senses the linear acceleration in multiple directions, from which calculations such as velocity, direction and position can be derived. The gyroscope senses an angular velocity of the remote microphone The multidirectional Accelerometer senses linear acceleration and gravitational orientation. When the wearer becomes unconscious or incapacitated, the Solid State Accelerometer (6) becomes activated by the wearer's motionlessness and subsequently activates the Emergency Alert as if the wearer pressed the Emergency Alert button (4) themselves.

In another embodiment of this invention, the Solid State Accelerometer (6) shall be programmable for various Motion-Sensing sensitivities. Additionally, the multidirectional Accelerometer (6) shall be programmable for various gravitational orientations.

In another embodiment of this invention, the motion sensing remote microphone can activate an audible Pre-Alarm warning signal.

In another embodiment of this invention, the Solid State Accelerometer (6) in the motion sensing remote microphone shall be programmable for various time frames for activation of both pre-alarm and full alarm modes. Motion sensor activation shall entail an alarm sequence of an audible pre-alarm mode, giving the wearer time to cancel the alarm, and then a full-alarm mode, which will activate the 'Emergency Alert' or 'Distress' signal the same as if the wearer physically activated the 'Emergency Alert' switch or button (4).

In another embodiment of this invention, the Solid State Accelerometer (6) in the motion sensing remote microphone shall be programmed to work in conjunction with the Solid State Gyroscope or a multidirectional Accelerometer (6) shall be used to provide physical orientation/activation interface settings. Motion sensor activation shall electronically tie-in to the physical activation process (button, switch) automatically and passively.

In another embodiment of this invention, the Solid State Accelerometer (6) in the motion sensing remote microphone shall be programmed to offer various sensitivities for physically canceling the pre-alarm sequence via movement of the device, i.e. shaking or tapping.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

It will be apparent to those skilled in the art that the objects of this invention have been achieved by providing the above invention. However various changes may be made in the structure of the invention without departing from the concept of the invention. Therefore, the scope of the invention is to be determined by the terminology of the following claims and the legal equivalents thereof.

What is claimed is:

1. A motion sensing remote microphone for use in portable radios comprising of a motion and orientation sensing device incorporated into said remote microphone (6) and powered by same supply characterized in that said motion/orientation sensing device includes a Solid State Accelerometer and/or a Solid State Gyroscope and/or a multidirectional Solid State Accelerometer (6) have programmable features for time delay activated by combinational variables of time and orientation and the emergency Alert (4) is electronically activated after a set amount of motionlessness when the longitudinal axis of the remote microphone (6) is oriented equal or greater than a set number of degrees away from the vertical plane.

2. The motion sensing remote microphone as claimed in claim 1 wherein said portable radio shall function utilizing assigned radio frequencies and may be generated in an analog or digital mode.

3. The motion sensing remote microphone as claimed in claim 1 wherein said remote microphone (6) shall have a manually activated Emergency Alert button (4).

4. The motion sensing remote microphone as claimed in claim 1 wherein said Solid State Accelerometer and/or Solid State Gyroscope and/or said multidirectional Solid State Accelerometer (6) are installed to interface with the transmission feature of said Emergency Alert button (4).

5. The motion sensing remote microphone as claimed in claim 1 wherein said Solid State Accelerometer and/or said multidirectional Solid State Accelerometer (6) senses the linear acceleration in multiple directions and determines velocity of said remote microphone (6).

6. The motion sensing remote microphone as claimed in claim 1 wherein said Solid State Accelerometer and/or said multidirectional Solid State Accelerometer (6) senses the linear acceleration in multiple directions and determines direction and/or gravitational orientation of said remote microphone (6).

7. The remote microphone as claimed in claim 1 wherein said Solid State Gyroscope or said multidirectional Solid State Accelerometer (6) senses axial relationships in multiple directions and determines orientation of said remote microphone (6).

8. The remote microphone as claimed in claim 1 wherein said Solid State Accelerometer and/or said Solid State Gyroscope and/or said multidirectional Solid State Accelerometer (6) have programmable features for time delay activated by combinational variables of time and orientation and the Emergency Alert (4) is electronically activated after a set amount of motionlessness when the longitudinal axis of the remote microphone (6) is oriented in the vertical plane.

9. The motion sensing remote microphone as claimed in claim 1 wherein said Solid State Gyroscope (6) senses the linear acceleration in multiple directions and determines angular velocity of the remote microphone (6).

10. The motion sensing remote microphone as claimed in claim 1 wherein said Solid State Accelerometer and/or said multidirectional Solid State Accelerometer (6) attains an activation threshold by calculating direction, position, velocity and angular velocity of said remote microphone (6).

11. The motion sensing remote microphone as claimed in claim 1 wherein activation threshold of said Solid State Accelerometer and/or said multidirectional Solid State Accelerometer (6) triggers an alarm sequence of an audible pre-alarm mode, giving the wearer time to cancel the alarm.

12. The motion sensing remote microphone as claimed in claim 1 wherein activation threshold of said Solid State Accelerometer and/or said multidirectional Solid State Accelerometer (6) triggers an alarm sequence of a full-alarm mode, same as manually activating said Emergency Alert button (4).

13. The motion sensing remote microphone as claimed in claim 1 wherein said Solid State Accelerometer and/or said multidirectional Solid State Accelerometer (6) is programmable for various Motion-Sensing sensitivities.

14. The motion sensing remote microphone as claimed in claim 1 wherein said Solid State Accelerometer and/or said multidirectional Solid State Accelerometer (6) can activate an audible Pre-Alarm warning signal.

15. The motion sensing remote microphone as claimed in claim 1 wherein said Solid State Accelerometer and/or said multidirectional Solid State Accelerometer (6) does not hinder physical activation of radio's Emergency Alert button (4).

16. The motion sensing remote microphone as claimed in claim 1 wherein said Solid State Accelerometer and/or said multidirectional Solid State Accelerometer (6) is programmed to offer various sensitivities for physically canceling a pre-alarm sequence via movement of said device by shaking or tapping.

* * * * *